May 17, 1949.    L. HORVITZ    2,470,401

EXPLORATION BY SOIL ANALYSIS

Filed March 23, 1939

LEO HORVITZ
INVENTOR.

BY Jesse R. Stone
Lester D. Clark
ATTORNEYS

Patented May 17, 1949

2,470,401

UNITED STATES PATENT OFFICE 2,470,401

EXPLORATION BY SOIL ANALYSIS

Leo Horvitz, Houston, Tex., assignor to
Esme E. Rosaire, Houston, Tex.

Application March 23, 1939, Serial No. 263,750

10 Claims. (Cl. 23—230)

This invention relates to geochemical prospecting, particularly the exploration for oil and related deposits by the quantitative detection of leakage products from these deposits, especially those which may have been retained in the soil near the surface of the earth, and comprises a continuation-in-part of my copending application Serial No. 183,959, filed Jan. 8, 1938 for Exploration by soil analysis, now abandoned.

The invention also relates generally to the subject matter of co-pending application, Serial No. 107,497, filed October 24, 1936, Geophysical prospecting method, by Leo Horvitz and E. E. Rosaire, now forfeited.

Oil and gas deposits manifest themselves at the surface of the earth by leakage through the overburden, gas seeps being a familiar example. Slow leaks are difficult to detect, but it has been found that some substances or compounds are present in the soil at or near the surface of the earth as a result of such leakage, such substances being generally lacking in soil overlying subsurface structures where such deposits are absent. The detection and measurement of the more stable of these substances or compounds and their correlation with the location of the buried deposits has been accomplished and constitutes the present invention. In the copending application above noted entrained components including gases from the deposits are detected whereas the present invention is based upon the discovery that there are other components which may be recovered in a non-volatile form as an indication of the presence of buried deposits which have given rise to such products in the surface soil.

A general object of the invention is to locate buried deposits such as oil and gas, by analyzing soil samples for evidence of leakage from the deposits.

Another object is the provision of a method of exploration which comprises the sampling of soil at systematically located points and analyzing the samples for entrained constituents which are significant of the proximate existence of the sought deposits.

A further object is to provide a prospecting method which is low in cost and yet possesses high sensitivity and finding power which may also be advantageously used to supplement or supplant known methods.

Another object is to locate buried deposits by a quantitative determination of a wax-like substance in the soil overlying the deposits. This substance is referred to herein as soil-wax.

Still another object is to provide a method of exploration by direct detection of substances related to sought deposits.

Another object is to provide a method of exploration for oil, gas and related deposits which are subject to leakage, by detecting the leakage products or other polymerized or otherwise modified derivatives.

It is also an object of the invention to locate oil, gas and related deposits by quantitatively analyzing surface soil samples for non-volatile substances whose presence indicates the existence of the buried deposits.

Other objects together with the foregoing will be apparent from the following description taken in connection with the drawings in which.

Figure 1:
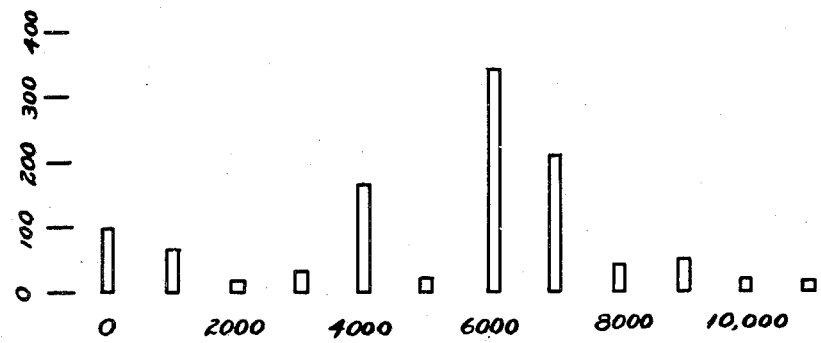
Fig. 1 is a diagrammatic illustration of results of the present invention and indicates the concentration of a non-volatile substance at different points along a profile in an area surveyed in accordance with the invention.
Figure 2:
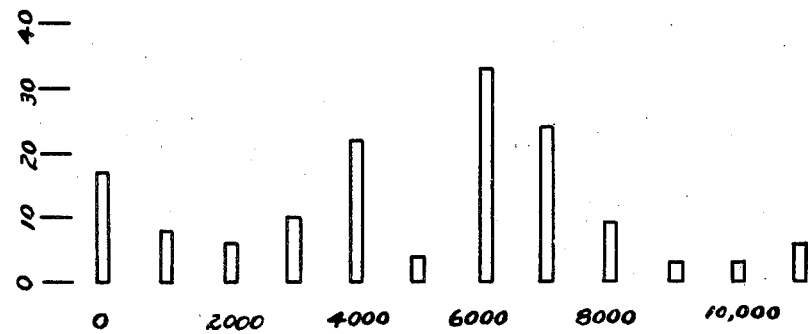
Fig. 2 is a diagrammatic illustration which shows the concentration of ethane over the same profile as that shown in Fig. 1 and determined in accordance with the invention of copending application, Serial No. 183,960, filed January 8, 1938, for "Means and method for analysis," now Patent No. 2,287,101, dated June 23, 1942.

In each of Figs. 1 and 2 the abscissa represents the profile distance in feet from the reference point indicated as 0. In Fig. 1 the ordinate represents the concentration of the non-volatile substance found in parts per million ($1 \times 10^{-6}$) of the dry soil sample. In a similar manner the ordinate in Fig. 2 represents the concentration of ethane in parts per billion ($1 \times 10^{-9}$) of the soil sample tested.

The method of practice of the invention comprises the steps of systematically collecting samples of soil near the surface of the earth over an area to be explored and subjecting these samples to an analysis to be described. The substance obtained by such analysis is a wax-like product of which the exact composition is unknown. Such substances may be an oxidation product of the leakage products which have diffused upwardly from the buried deposits or it may be the result of the modification of organic material by such leakage products. On the other hand, such substance may comprise oxidized hydrocarbons that have been subsequently polymerized. At any rate, such substance comprises non-volatile compounds which are not direct leakage products. The chemical and physical characteristics of this substance will be hereinafter described.

The soil to be sampled is collected in a manner appropriate to the method of analysis employed. For use in conjunction with the specific method of analysis to be described, the soil should be taken at a shallow depth as it appears that the concentration of the substance sought decreases with the increase in depth at which the soil sample is taken. I prefer that samples be taken at the surface or at most at a depth of but an inch or so although the invention is not confined to such sampling depth since results have been obtained in samples taken at depths of several feet.

The present invention should not be confused with methods which involve the analysis of soil gas, or the soil itself for direct leakage products wherein the soil or soil gas samples are taken at a greater depth. In the case of soil samples, for example, wherein the leakage products are occluded or combined with the soil and these entrained constituents are caused to be evolved for analysis, the samples are taken at a depth of several feet or a greater depth and preferably below the water table.

The substance sought as it exists in the soil is insoluble in common organic solvents. In the preferred procedure therefore the soil sample is first treated with an organic solvent, for example, carbon tetrachloride, acetone, ethyl ether, chloroform, ethyl acetate, benzene, petroleum ether, or mixtures thereof, in order to extract all soluble organic matter that may be present. The sample is then treated with a mineral acid, such as hydrochloric acid and such treatment is followed by the use of an organic solvent such as carbon tetrachloride, benzene, petroleum ether or the like solvents, whereby a yellowish-orange waxy substance is obtained.

After the evaporation of the solvent the residue is weighed and expressed in per cent or parts per million of the total sample weight. Plotting results on a map and drawing contours, a concentration map is produced which has been found to check favorably with results obtained by more elaborate methods and further to correlate closely with the presence of known deposits.

Although the invention is not limited thereto, attention will now be directed by way of example to a more detailed procedure in the preferred form of the practice of the invention.

Refuse, including grass roots, is scraped from the earth's surface and a soil sample is collected from the cleaned area. Any soil seems to be suitable, including sand, gravel, clay or mixtures thereof. The sample is then taken to the laboratory where it is dried, pulverized and screened. It is then treated by boiling for thirty minutes with a mixture of acetone and carbon tetrachloride to remove soluble organic matter. The sample is then washed and dried. The dried sample is then boiled for fifteen minutes in a 50% hydrochloric acid solution. The mixture is then filtered and the soil is washed with water and dried. After drying the sample is again pulverized and boiled in carbon tetrachloride for two hours, after which the mixture is filtered and the filtrate is evaporated to dryness. As above stated the residue thus obtained consists of a waxy substance. This substance is re-dissolved in carbon tetrachloride and filtered to remove impurities. After again evaporating to dryness, the waxy residue is carefully weighed.

As an alternative to the procedure above described, nitric acid has been used instead of hydrochloric acid and has been found to yield similar results. However, hydrochloric acid has been adopted in routine procedure because of greater convenience in handling. Sulphuric acid may also be used but is not highly satisfactory because of harmful effects which may result in case of spilling. Acetic acid has also been tried and while not resulting in so high a yield as the mineral acids, consistent results are obtainable and it is mentioned here to indicate that organic acid treatment properly comes within the scope of this invention.

The description of the preferred method of practice is in accordance with the technique normally applied, but may be varied in special cases. For example, the initial step of extraction with carbon tetrachloride and/or other solvent may be omitted when running samples from desert areas where there is little or no organic matter normally present. While this cleaning step is desirable in the majority of cases it is not deemed to be strictly of the essence since samples from certain areas have been run omitting this step with results comparable to duplicates run as previously described. Experience in use of the method in routine prospecting indicates that this step may be eliminated entirely in all areas where artificial contamination by petroleum derivatives is absent.

Likewise the various water-washing steps may be omitted although it appears that slightly greater uniformity between duplicate analyses occurs when the samples are washed with water between the chemical steps.

Since the initial extraction step has been shown to be desirable but non-essential, it is not required for satisfactory results when the first extraction step is employed that the final extraction step be accomplished with the same solvent as that used in the first step. Obviously both extractions should be carried out with a chemical in which the wax is soluble. A complete list of solvents would be impossible and superfluous, but in the description of the wax a short list of solvents is included which should suffice to show the classes of solvents which are suitable.

In carrying out a survey over a known oil field, the amounts detected correlated with the known limits of the field and with the surface projections of known faulting. The maximum concentration of the measured substance was found to delineate the approximate outer limits of the producing area and the concentration dropped rapidly as the apparent limits of the field were passed. Over normal or non-productive areas the content was found to be uniformly very small. The presence and amount of this substance definitely indicate abnormality of an area with respect to possible productivity of deposits giving rise to leakage therefrom. Correlation of results is also strikingly shown by comparison of the diagrammatic illustration of Figs. 1 and 2 of the drawings, whereby substantial identity of results are shown with those obtained by the method of the above mentioned application.

It has been found that the high concentration of leakage constituents is not directly over a structure but in a ring or halo with its center generally over the structure. In the figure it appears that station 0 is in one edge of the halo, and stations 4000, 5000, and 6000 are in the other edge of the halo, with station 5000 exhibiting one of the minor local anomalies that prevents any exploration system from being a sure-fire method of locating exactly the best well site. It may be here noted that the reference numerals refer, by way of example, to the concentration of parts of the substance per million parts of the sample utilized.

The soil wax is separable into two parts by treating it with acetone, ethyl acetate, or certain other solvents. A portion dissolves out, and the remainder consists of a firm white wax which seems to be fairly pure and will be referred to as "α soil-wax" or simply "α-wax" for brevity. On evaporating the acetone solvent a reddish to reddish brown oily liquid remains which is probably a mixture of several compounds as yet not definitely identified. This oily residue will be referred to as β-component of soil-wax, or for brevity, β-wax, although it is not a true wax.

The characteristics of the α-soil-wax are as follows:

Molecular weight determined by camphor depression was found to be 411 to 428; average of 4 determinations, 417.

Melting point 81.5°–82.5° C.

Average analysis 13.65% hydrogen, 81.84% carbon, remainder 5.51%, presumably oxygen.

Reactions indicate the probable presence of an OH group, and an absence of the following:

Nitrogen
Halogen
Sulphur
Phosphorous
Alkoxyl-group (OC$_2$H$_5$)
Aldehyde-group (CHO)
Carboxyl-group (COOH)

Under these data tentative empirical formulae with their molecular weights might be tabulated as follows:

$$C_{27}H_{54}O, 404$$
$$C_{28}H_{56}O, 430$$

However, in the light of one analyst's experience, the empirical formula is tentatively given as $$C_{27}H_{56}O, 396$$

with the suggestion of the possibility that it is an alcohol of a saturated fatty acid of high molecular weight known in the literature under the name of carbocerinic acid. In this case, assuming the empirical formula to be correct, the structural formula for the α-soil-wax would be $$CH_3(CH_2)_{25}CH_2OH$$

There is a possibility that the substance is an alcohol of an unsaturated fatty acid and has a formula $$C_{27}H_{53}O, 393$$

But this is deemed unlikely, as unsaturated compounds are not, generally speaking, likely to occur in surface soils.

These molecular weights appear low compared with the value 417 determined by camphor depression, but while the α-wax is considered fairly pure, a very small percentage content of a very high molecular weight substance could readily account for the descrepancy of only 5% between 396 and 417. The melting point range may be accounted for by the assumed presence of a very small quantity of such impurity.

A table of solubility is given after the later description of the component of the soil wax.

Specific rotation (polarization) was found in one case to be 2.0 but this may be due to some minute impurity and so is regarded as insignificant.

Physically the α-wax is either white or faintly ivory tinted depending upon the degree of purity. As ordinarily encountered it appears to be granular. Upon melting and resolidifying it forms a firm cake which may be readily broken.

The β component, a viscous liquid at ordinary temperatures with no sharp freezing or boiling point, is doubtless a mixture. Its average molecular weight is approximately 340. The average analysis indicates H 10.73%
C 69.80%
Cl 3.94%
O 15.53% (remainder)

Reaction tests indicate the presence of an aldehyde group (CHO) found by U. S. P. Fuchsine reagent, and a carboxyl group (COOH). Further tests indicate the absence of nitrogen and phosphorous, with only traces of sulphur.

The sample dissolved in chloroform absorbs about 17% bromine suggesting double bonds or phenolic group or groups. It is possible that the mixture contains a compound of ring structure in view of the possible phenolic group. A double bond appears unlikely—considering the origin of the sample. The chlorine seems to be due to an impurity consisting of halogenated hydrocarbons.

A partial table of solubility for α and β-waxes is as follows:

| Solvent | α-wax | β-wax |
|---|---|---|
| Ethyl acetate | Insoluble (cold) / Soluble (hot) | Soluble. |
| Acetone | Insoluble (cold) / Slightly soluble (hot) | Do. |
| Carbon tetrachloride | Soluble | Do. |
| Ethyl Alcohol | Insoluble (cold) / Slightly soluble (hot) | Do. |
| Ethyl ether | Insoluble (cold) / Slightly soluble (hot) | Do. |
| Water | Insoluble | Insoluble. |
| Benzene | Soluble | Soluble. |
| Petroleum ether | ----do---- | Do. |
| Toluene | ----do---- | Do. |
| Chloroform | ----do---- | Do. |
| 50% sodium hydroxide | Insoluble / No apparent reaction | Insoluble. No apparent reaction. |
| Conc. hydrochloric acid | Insoluble / No apparent reaction | Insoluble. No apparent reaction. |

It should be understood that the foregoing analyses are difficult and subject to some error, since the amount available for analysis is very small. With average soil samples running only 100 parts of total α and β components per million parts of soil, it requires 300 soil samples of 30 grams each to produce a gram of total wax.

The character of the soil wax is in accord with the conclusion previously reached that the wax is probably a polymerized and partially oxidized product of the constituents which leak from the deeply buried deposits. It may be that the α-wax is an end product and the β-component is an intermediate product. Or, possibly the α and β components may each be end products from different origins such as might happen if one is produced from a saturated and the other from an unsaturated series.

Regardless of the correctness of any hypothesis of origin, or the exact composition of the components, there can be no doubt of the high correlation between the existence and amount of the wax and the proximity of the found wax concentrations to buried deposits of oil gas and related substances.

The ratio of α to β wax components is not a constant, although it has been found that contour maps based on the determination of either separately from a group of soil samples is indicative of the same information relative to location of the source deposits.

The ratio of α-wax to β-component varies with the depth at which the samples are taken. For example soil samples taken from the top ½" run a higher α/β ratio than samples taken between ½" and 1" depth.

I prefer to practice the invention by running analyses for total wax, though of course it would be entirely within the scope of the invention to run analyses for both α-wax and β-wax, or either to the exclusion of the other.

Thus the essence of the invention is that of exploring for indications of the proximity to oil gas and related deposits by analysing soil samples collected over an area for their soil-wax content.

What is claimed is:

1. In the art of exploration for oil, gas and related deposits in which the presence and proximity of such deposits to soil samples is indicated by the existence in the samples of diffused constituents from said deposits which have been modified in the soil into a form insoluble in the native environment of the samples, the method comprising collecting soil samples at spaced points in the area to be explored treating each soil sample successively with hydrochloric acid and an organic solvent for the wax-like material soluble in carbon tetrachloride contained in said soil samples, and measuring the amount of material extracted by the solvent whereby the amounts of said material extracted from the several soil samples may be correlated with soil sample locations to yield data useful in the location of the deposit sought for.

2. In the art of exploration for oil, gas and related deposits in which the presence and proximity of such deposits to soil sampes is indicated by the existence in the samples of diffused constituents from said deposits which have been modified in the soil into a form insoluble in the native environment of the samples, the method comprising collecting soil samples at spaced points in the area to be explored treating each soil sample successively with a mineral acid and an organic solvent for the wax-like material soluble in carbon tetrachloride contained in said soil samples, and measuring the amount of material extracted by the solvent whereby the amounts of said material extracted from the several soil samples may be correlated with soil sample locations to yield data useful in the location of the deposit sought for.

3. A method of locating subsurface petroleum deposits from which there has been a migration of diffusable components which have deposited in the subjacent formation substantially at the earth surface a derivative capable of yielding a waxlike component which is indicative of the proximity of the petroleum deposit, the steps of collecting soil samples at laterally spaced points substantially at the surface of the earth and determining the amount of waxy substance available in each sample by the steps of drying, pulverizing and screening the sample, boiling the sample with a mixture of acetone and carbon tetrachloride to remove soluble organic matter, washing and drying the sample, boiling the sample with a solution of hydrochloric acid, filtering the sample and washing, drying and pulverizing the remaining material, boiling the material in carbon tetrachloride, evaporating the filtrate therefrom to dryness, re-dissolving this residue in carbon tetrachloride and again evaporating to dryness whereby the amounts of the residues thus obtained from the several samples may be correlated with sample locations to yield data useful in locating the deposit sought for.

4. A method of locating subsurface petroleum deposits from which there has been a migration of diffusable components which have deposited in the subjacent formation substantially at the earth surface a waxlike component which is indicative of the proximity of the petroleum deposit, the steps of collecting soil samples at laterally spaced points substantially at the surface of the earth and treating each soil sample for the purpose of determining the amount of waxy substance available in the sample by the steps of drying, pulverizing and screening the sample, boiling the sample with carbon tetrachloride to remove soluble organic matter, washing and drying the sample, boiling the sample with a solution of hydrochloric acid, filtering the sample and washing, drying and pulverizing the remaining material, boiling the material in carbon tetrachloride, evaporating the filtrate therefrom to dryness, re-dissolving this residue in carbon tetrachloride and again evaporating to dryness whereby the amounts of the residues thus obtained from the several samples may be correlated with sample locations to yield data useful in locating the deposit sought for.

5. In the art of exploration for oil, gas and related deposits in which the presence of such deposits is indicated by the existence in soil samples taken at a distance from said deposits of diffused constituents from said deposits which have been modified into a form insoluble in their native environment, the method comprising collecting such soil samples, treating each soil sample with an acid and then with an organic solvent, said solvent being selected from the group consisting of carbon tetrachloride, petroleum ether, benzene, toluene, and chloroform, and measuring the amount of material extracted by the solvent whereby the amounts of extracted material from the several soil samples may be correlated with sample locations to yield data useful in the location of the deposit sought for.

6. In the art of geological exploration, the method of approximating the location of petroleum deposits which comprises systematically collecting a series of samples of surface soil at spaced locations, drying said samples, treating with hydrochloric acid, washing and drying the samples, extracting with carbon tetrachloride, measuring the relative amounts of petroleum derived constituents extracted by the carbon tetrachloride and systematically tabulating said measurements with reference to the original location of the samples.

7. In the art of geological exploration, the method of approximating the location of petroleum deposits which comprises systematically collecting a series of samples of surface soil at spaced locations, treating the samples with hydrochloric acid, extracting the samples with carbon tetrachloride, measuring the relative amounts of material extracted by carbon tetrachloride, and tabulating the measurements with reference to the original location of the samples.

8. In the art of exploration for oil, gas and related deposits, the steps of collecting soil samples at spaced points in the area to be explored, treating each soil sample with a solvent selected from the group consisting of carbon tetrachloride, acetone, petroleum ether, benzene, toluene, and chloroform, then treating said sample with an acid and again treating the sample with one of the aforementioned solvents to extract from said sample a constituent derived from diffusion products from the deposits sought for, and measuring the amount of said constituent so extracted, whereby the amounts of the extracted constituent from the several soil samples may be correlated with sample locations to provide data useful in the location of the deposit sought for.

9. A method according to claim 8 in which the solvent for the final extraction is the same as the solvent used in the first treatment.

10. In the art of exploration for oil, gas and related deposits, the steps of collecting soil samples at spaced points in the area to be explored, treating each soil sample with an acid, and then with an organic solvent capable of dissolving any wax-like body soluble in carbon tetrachloride derived from diffused constituents from said deposit which may be contained in said soil sample, and measuring the amount of material extracted from said sample by said solvent, whereby the amounts extracted from the several solvents may be correlated with sample locations to yield data useful in locating the deposit sought for.

LEO HORVITZ.

REFERENCES CITED

The following references are of record in the file of this patent:

UNITED STATES PATENTS

| Number | Name | Date |
|---|---|---|
| 1,843,878 | Laubmeyer | Feb. 2, 1932 |
| 1,994,884 | Chew | Mar. 19, 1935 |
| 2,320,577 | Dunn | June 1, 1943 |

OTHER REFERENCES

Collom, Bureau of Mines Bulletin #201 (1922), inclusive, "Indication or Signs of Oil or Gas," pp. 24-28.